US011498702B2

(12) United States Patent
Borowicz

(10) Patent No.: US 11,498,702 B2
(45) Date of Patent: Nov. 15, 2022

(54) BONDING TOOL FOR AIRCRAFT STRUCTURAL PARTS

(71) Applicant: The Boeing Company, Chicago, IL (US)

(72) Inventor: Clifford D. Borowicz, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 296 days.

(21) Appl. No.: 16/886,324

(22) Filed: May 28, 2020

(65) Prior Publication Data

US 2021/0371130 A1    Dec. 2, 2021

(51) Int. Cl.
*B64F 5/10* (2017.01)
*B64C 3/18* (2006.01)
*B64C 3/26* (2006.01)
*B29C 65/48* (2006.01)
*B29C 70/34* (2006.01)
*B29C 33/50* (2006.01)
*B29D 99/00* (2010.01)
*B29L 31/30* (2006.01)

(52) U.S. Cl.
CPC .............. *B64F 5/10* (2017.01); *B29C 33/505* (2013.01); *B29C 65/4825* (2013.01); *B29C 70/342* (2013.01); *B29D 99/0014* (2013.01); *B64C 3/187* (2013.01); *B64C 3/26* (2013.01); *B29L 2031/3085* (2013.01)

(58) Field of Classification Search
CPC ....... B64F 5/10; B29D 99/0014; B64C 3/187; B64C 3/26; B29L 2031/3085; B29C 33/505; B29C 70/342; B29C 65/4825; B29C 65/7847; B29C 66/82421; B29C 66/81455; B29C 2043/3649; Y10T 156/1089; Y10T 156/1092
See application file for complete search history.

(56) References Cited

U.S. PATENT DOCUMENTS 3,376,184 A * 4/1968 Ritchey ................. B29C 66/636
100/269.03
2017/0043529 A1* 2/2017 Sanderson ......... G05B 19/4099
2019/0031315 A1* 1/2019 Edwards ................... B64C 3/26

FOREIGN PATENT DOCUMENTS

EP          1153734 A2 * 11/2001  ............. B29C 65/10

OTHER PUBLICATIONS

Machine translation of EP 1153734 date unknown.*

* cited by examiner

Primary Examiner — John L Goff, II
(74) Attorney, Agent, or Firm — Duft & Bornsen, PC

(57) ABSTRACT

A bonding tool is described that is used to secure sacrificial pads to bonding locations on a perimeter of a rib during a bonding process. In one embodiment, the bonding tool includes a base member having a rib receptacle dimensioned to receive a rib of a wing, a plurality of compression forms disposed around at least a portion of the rib receptacle and proximate to a perimeter of the rib, where the compression forms include a plurality of sacrificial pads that face towards bonding locations on the perimeter of the rib, and at least one bladder proximate to the compression forms that expands between a wall of the base member and the compression forms to press the sacrificial pads against the bonding locations while the sacrificial pads bond to the bonding locations.

20 Claims, 24 Drawing Sheets

BONDING TOOL FOR AIRCRAFT STRUCTURAL PARTS

FIELD

This disclosure relates to the field of manufacturing, and in particular, to manufacturing processes for aircraft.

BACKGROUND

During a wing assembly process for an aircraft, ribs and spars are assembled to form a skeleton for the wing. The ribs generally have a perimeter shape that defines the airfoil for the wing, and skin panels are attached along the perimeter of the ribs to form a smooth surface for the wing.

In order to ensure a proper fitment of the skin panels to the ribs, sacrificial pads may be bonded to the perimeter of the ribs where the inside surfaces of the skin panels attach to the ribs. The sacrificial pads may then be machined prior to installing the skin panels in order to achieve the fitment tolerances desired in the final wing assembly. The sacrificial pads are used in order to preclude a possible machining process on the ribs themselves, which may impact the structural integrity of the ribs.

Typically, installing the sacrificial pads onto the ribs is time consuming manual process, which entails additional man-hours of assembly time for a wing, with each rib utilizing a plurality of sacrificial pads that are installed by hand, secured in place in order to perform a bonding process, and finally, bonded to the rib. This process may be repeated for each rib in the wing, of which there are many.

Based on the forgoing discussion, it therefore remains desirable to improve the fabrication process for aircraft, and in particular, to improve processes for bonding sacrificial pads to aircraft parts, including ribs.

SUMMARY

A bonding tool is described that is used to secure sacrificial pads to bonding locations on a perimeter of a rib during a bonding process. The bonding tool includes a rib receptacle that accepts a major surface of the rib, with compression forms proximate to a perimeter of the rib around the rib receptacle. At least one bladder is disposed proximate to the forms, which when pressurized, expands between a wall of the base member and the forms to press the sacrificial pads to the bonding locations on the rib during a bonding process. The use of the bonding tool greatly increases the speed at which sacrificial pads are applied to the bonding locations on a perimeter of the rib, and further ensures a consistent bond line at the bonding locations due to the uniform pressure applied by the bonding tool, both of which provide technical benefits of improving the manufacturing process for the wing.

One embodiment comprises a bonding tool that includes a base member having a rib receptacle dimensioned to receive a rib of a wing, a plurality of compression forms disposed around at least a portion of the rib receptacle and proximate to a perimeter of the rib, where the compression forms include a plurality of sacrificial pads that face towards bonding locations on the perimeter of the rib. The bonding tool further includes at least one bladder proximate to the compression forms that expands between a wall of the base member and the compression forms to press the sacrificial pads against the bonding locations while the sacrificial pads bond to the bonding locations.

Another embodiment comprises a method of operating a bonding tool. The method comprises securing a rib for a wing in a rib receptacle of a base member of the bonding tool, installing a plurality of compression forms around at least a portion of the rib receptacle and proximate to a perimeter of the rib, where the compression forms include a plurality of sacrificial pads that face towards bonding locations on the perimeter of the rib, and pressurizing at least one bladder proximate to the compression forms that expands between a wall of the base member and the compression forms to press the sacrificial pads against the bonding locations while the sacrificial pads bond to the bonding locations.

Another embodiment comprises a bonding tool that includes a base member having rib receptacle dimensioned to receive a rib of a wing, where the base member includes a wall that projects from a surface of the base member. The bonding tool further includes a vacuum plate disposed within the rib receptacle that applies a vacuum to a major surface of the rib to secure the rib to the base member, a plurality of compression forms around at least a portion of the vacuum plate and proximate to a perimeter of the rib, where the compression forms include a plurality of sacrificial pads that face bonding locations on the perimeter of the rib. The bonding tool further includes and at least one bladder proximate to the compression forms that expands between a wall of the base member and the compression forms to press the sacrificial pads against the bonding locations while the sacrificial pads bond to the bonding locations.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
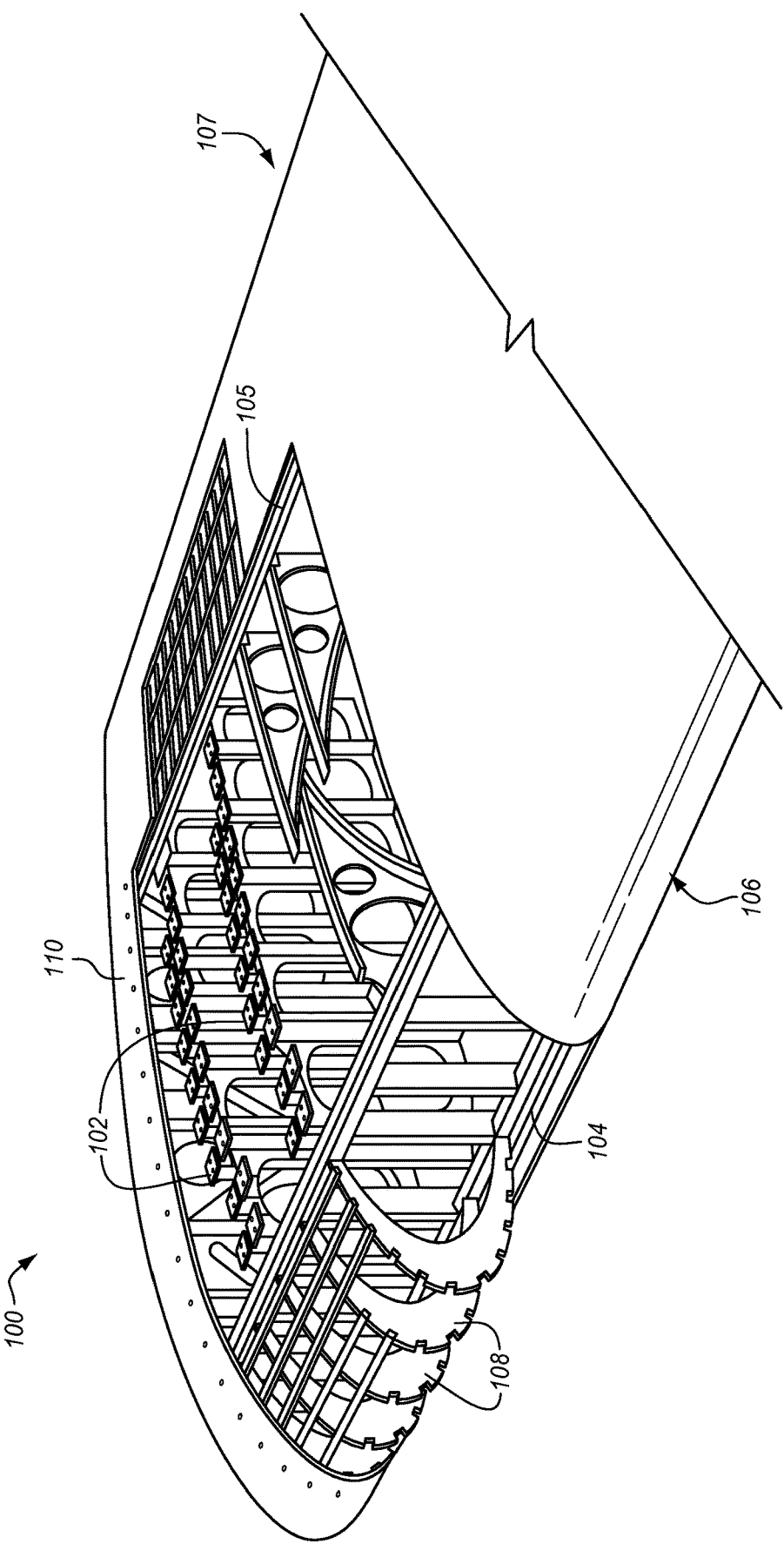
FIG. 1 depicts a wing of an aircraft in the prior art.

FIG. 1 depicts a wing 100 in the prior art. Wing 100 includes a plurality of ribs 102, which extend between a front spar 104 and a rear spar 105, with front spar 104 near a leading edge 106 of wing 100 and rear spar 105 towards a trailing edge 107 of wing 100. In FIG. 1, ribs 102 are space apart along a length of wing 100, and their perimeters form a shape of an airfoil for wing 100. In FIG. 1, wing 100 includes nose ribs 108, which extend from front spar 104 towards leading edge 106 of wing 100 to form the front shape of the airfoil at leading edge 106. Wing 100 also includes an outer skin 110, which is partially removed in this view in order to show the underlying structure of wing 100.

As evident in FIG. 1, ribs 102 and spars 104-105 form the skeleton of wing 100, with outer skin 110 adopting the shape of ribs 102 along their peripheral surfaces between spars 104-105.

Figure 2:
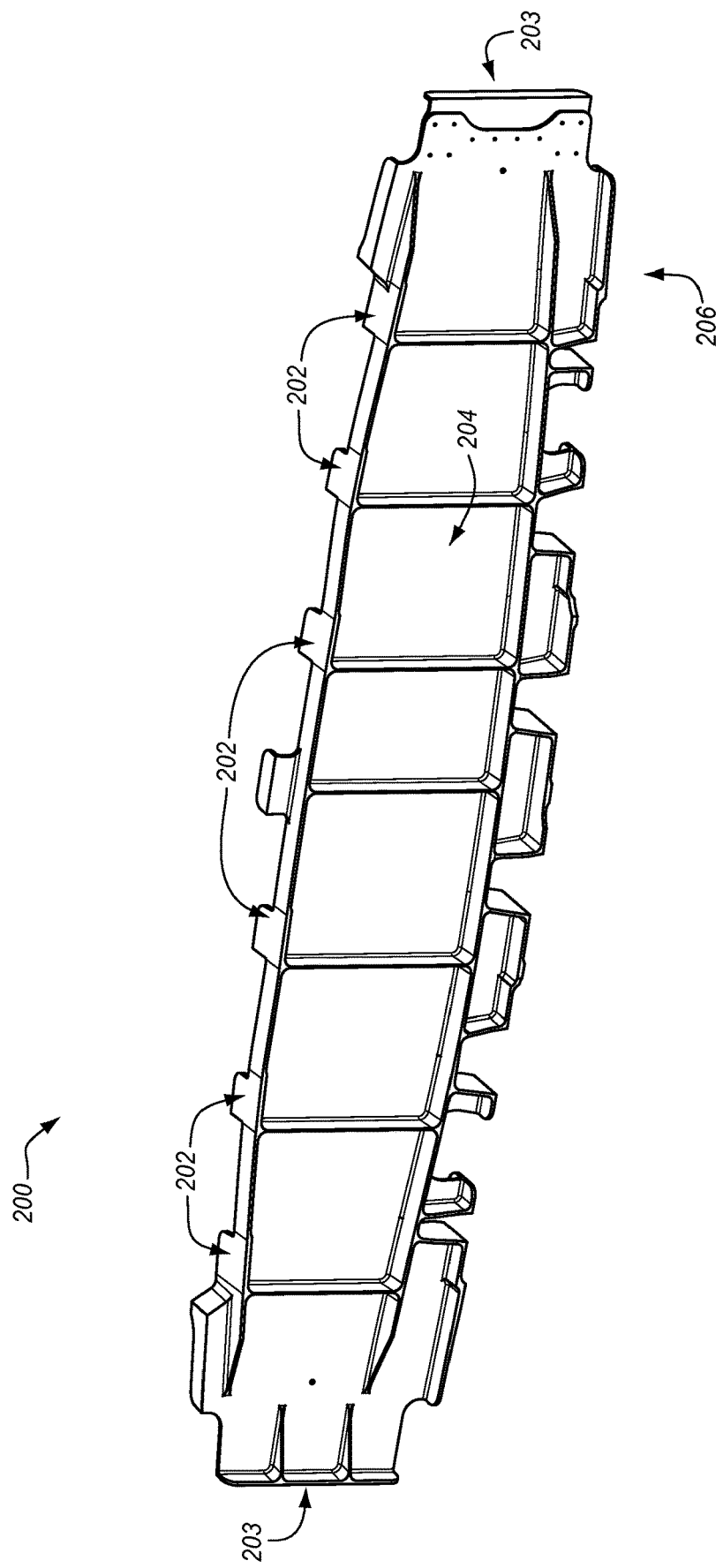
FIGS. 2-5 are isometric views of a rib for a wing of an aircraft in an illustrative embodiment.
Figure 3:
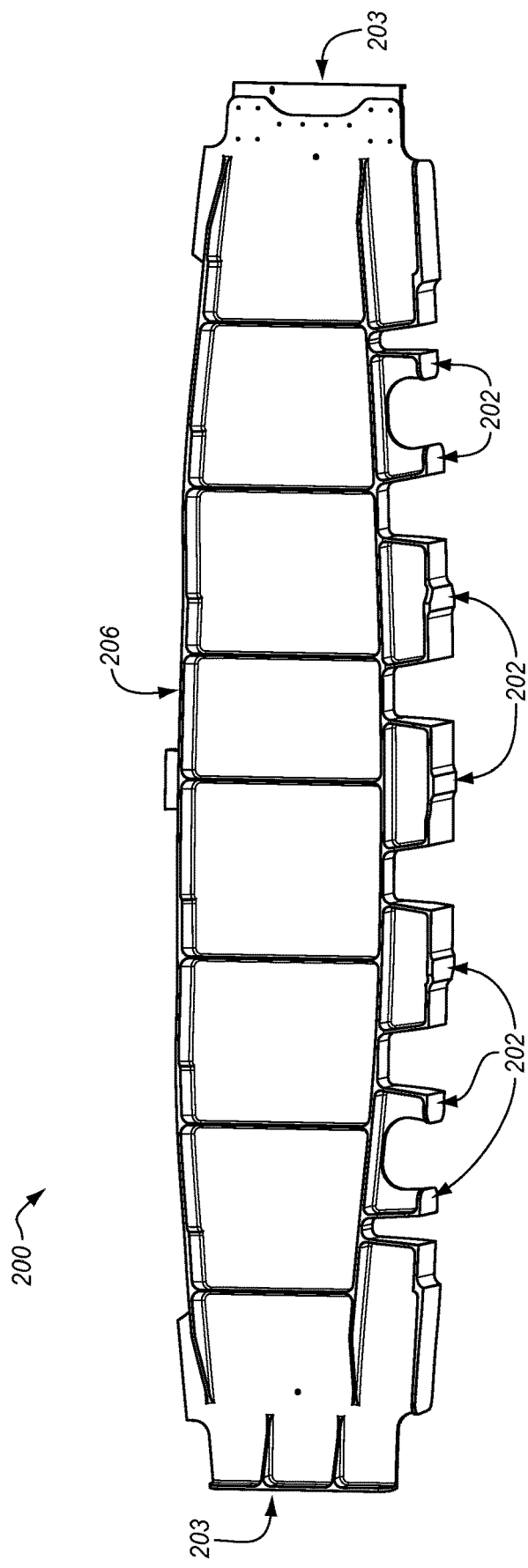
Figure 4:
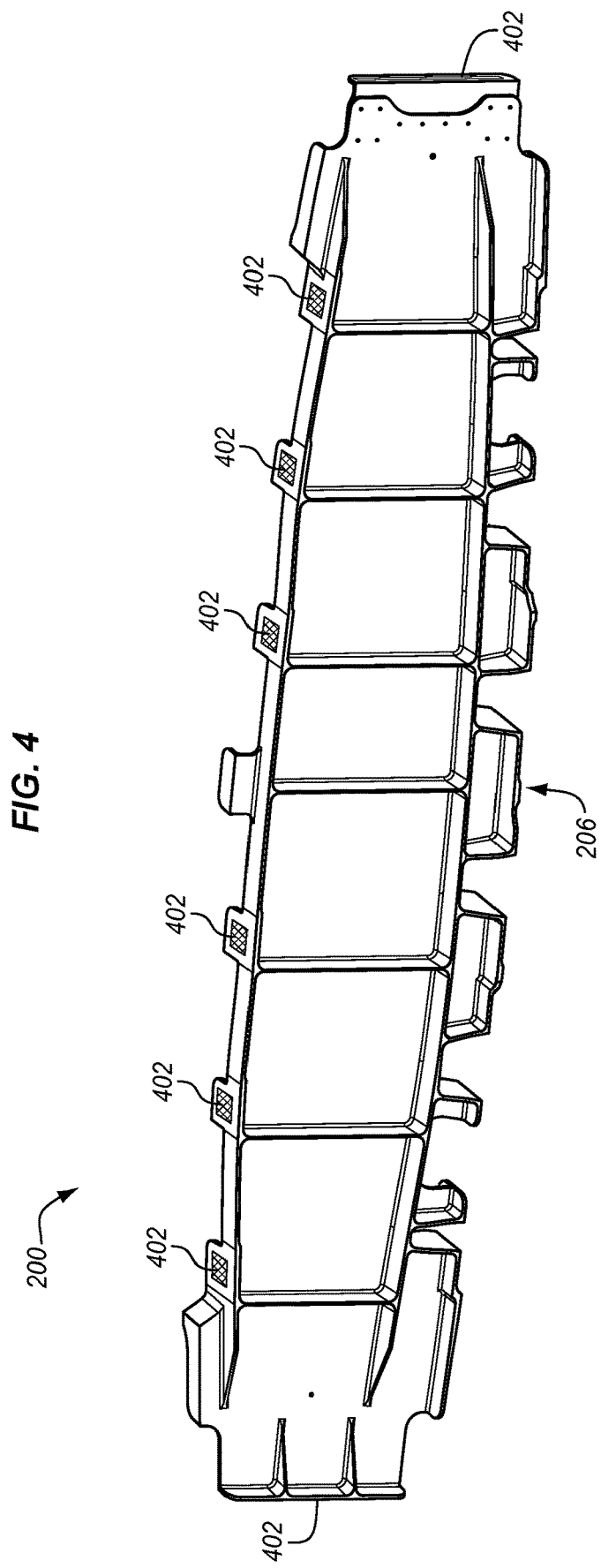
Figure 5:
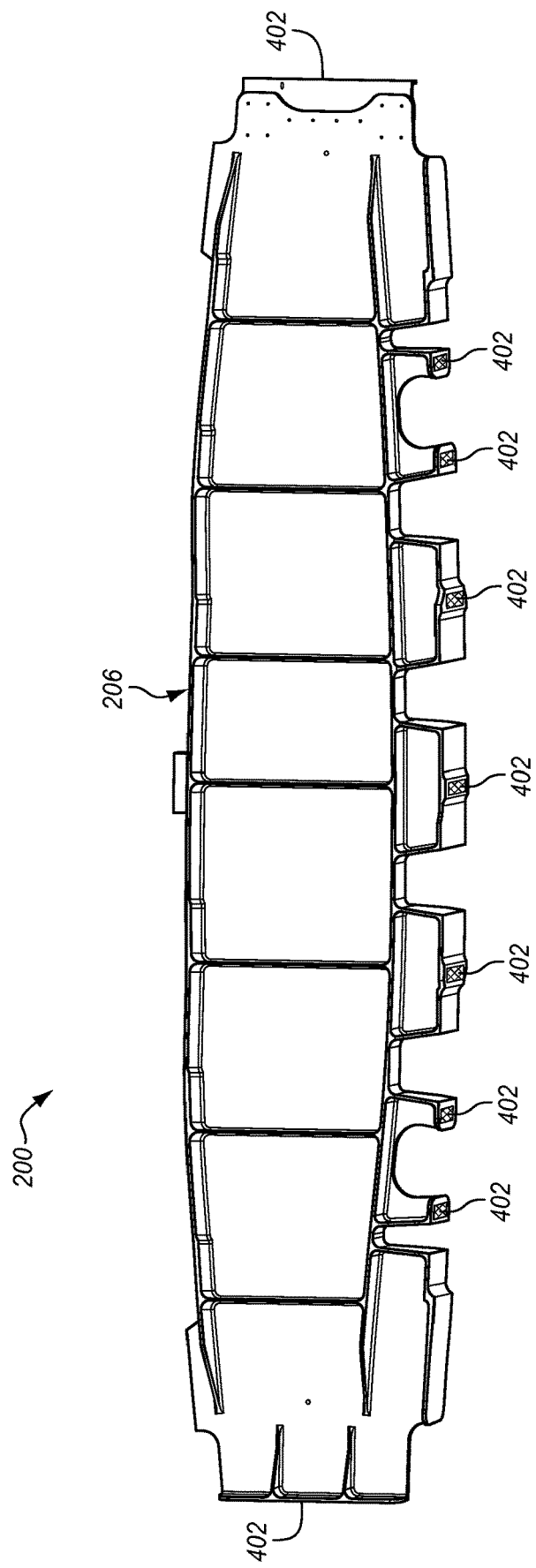

FIGS. 2-5 are isometric views of a rib 200 for a wing of an aircraft in an illustrative embodiment. FIGS. 2-3 depict rib 200 without sacrificial pads 402, and FIGS. 4-5 depict rib 200 with sacrificial pads 402 applied to rib 200. Generally, the view in FIGS. 2-5 are of a surface 204 of rib, with a surface 205 hidden and not apparent until FIG. 7. The differences between surfaces 204-205 will become more readily apparent in a later discussion.

In some embodiments, rib 200 may be referred to as a structural part for an aircraft or a workpiece. Thus, the terms "rib", "structural part", and "workpiece" are interchangeable in this disclosure. Rib 200 may be formed from any material as desired. Typically, rib 200 is formed from aluminum, although rib 200 may be formed from other metals and/or include composite parts as part of an assembly.

In this embodiment, rib 200 has a particular shape and configuration merely for purposes of discussion. Thus, rib 200 may have a different shape and configuration as a matter of design choice in other embodiments, and the processes described herein for bonding sacrificial pads 402 to rib 200 may be applied to other wing ribs.

As discussed previously, sacrificial pads 402 (see FIG. 4) may be secured to rib 200 at various bonding locations 202-203 at perimeter 206 of rib 200 in order to allow machining operations to be performed on sacrificial pads 402 instead of rib 200 when installing skin panels on the wing. Bonding locations 202-203 206 are located at positions on perimeter 206 where rib 200 mates to either a skin panel or a spar.

Sacrificial pads 402 may be, for example, fiberglass, a composite material, a metal, or any combination of materials having a thickness between 0.05 inches and 0.15 inches, with a preferred thickness of about 0.1 inches. The dimensions of sacrificial pads 402 (e.g., their width, thickness, and/or length) may vary depending on where they are placed on rib 200.

In FIGS. 2-5, bonding locations 202 correspond to regions on perimeter 206 of rib 200 where rib 200 will be attached to an inside surface of one or more skin panels that form the continuous surface for the wing. Bonding locations 203 correspond to regions on perimeter 206 of rib 200 where rib 200 is attached to spars. Bonding locations 202-303 may vary based on the design of the wing, and the particular placement of bonding locations 202-203 in this disclosure is merely for purposes of discussion.

FIGS. 4-5 depict rib 200 with sacrificial pads 402 applied to rib 200 at bonding locations 202-203. Sacrificial pad 402 may be bonded to rib 200, for example, using an epoxy that is applied to either bonding locations 202-203 on rib 200 or exposed surfaces of sacrificial pads 402.

In the embodiments described herein, sacrificial pads 402 are bonded to rib 200 using a bonding tool that applies and secures sacrificial pads 402 at bonding locations 202-203 on rib 200 simultaneously. The bonding tool therefore provides a technical benefit of speeding up the process of installing sacrificial pads 402 at bonding locations 202-203 on rib 200 and also providing a uniform bonding line between sacrificial pads 402 and bonding locations 202-203, thereby improving the manufacturing process for an aircraft wing. With sacrificial pads 402 bonded to rib 200, rib 200 may then be installed in a wing.

Figure 6:
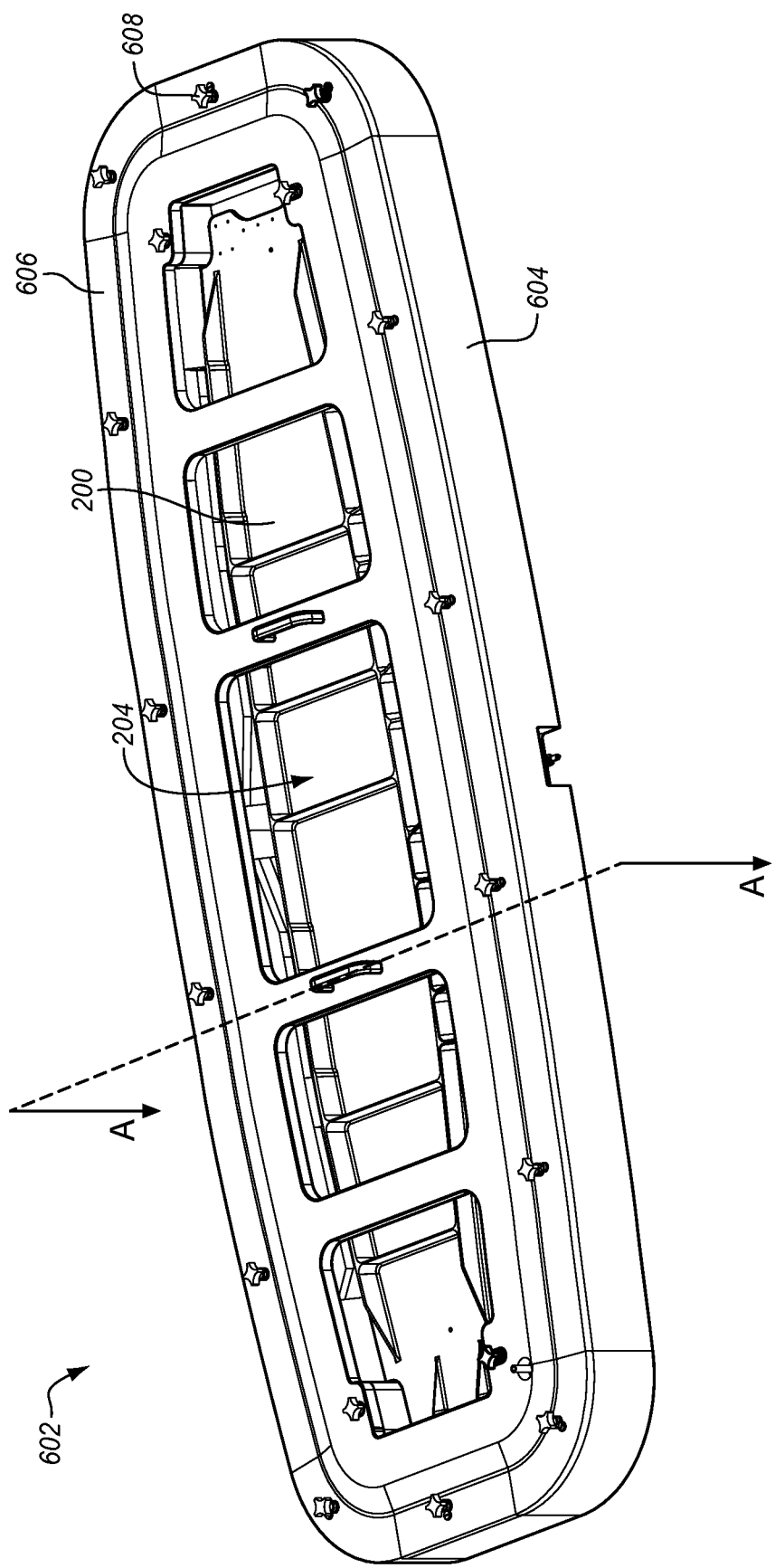
FIG. 6 is an isometric view of a bonding tool in an illustrative embodiment.
Figure 7:
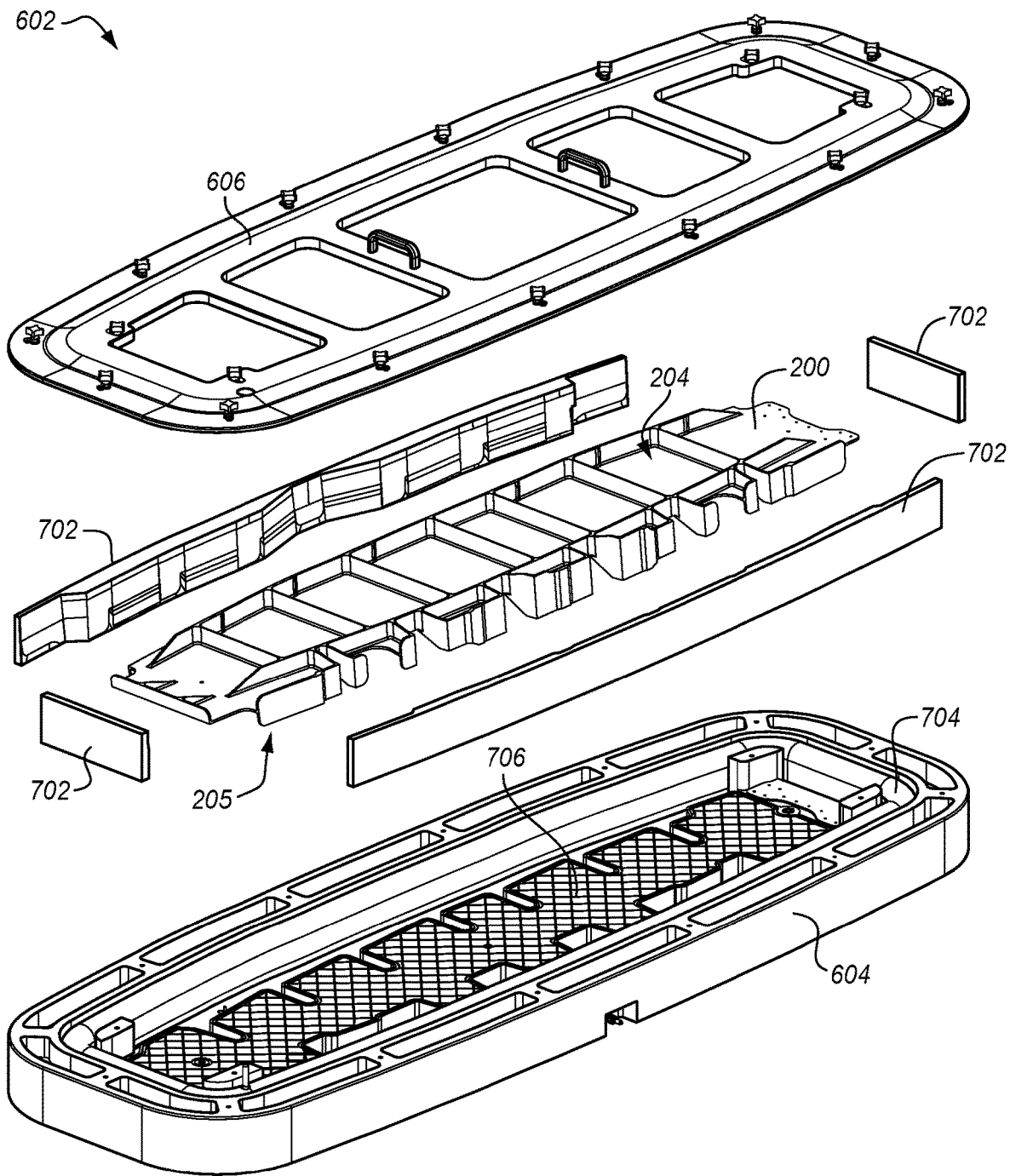
FIG. 7 is an exploded view of the bonding tool of FIG. 6 in an illustrative embodiment.

FIG. 6 is an isometric view of a bonding tool 602 in an illustrative embodiment, and FIG. 7 is an exploded view of bonding tool 602 in an illustrative embodiment. Although bonding tool 602 is described as having a particular configuration, bonding tool 602 may have other configurations in other embodiments. For example, bonding tool 602 may have more or fewer components and/or a different configuration of components depending on the shape and configuration of rib 200. Thus, bonding tool 602 and rib 200 are not limited to the specific configurations described herein.

Referring to FIG. 6, bonding tool 602 includes a base member 604 that supports rib 200 during the bonding process, and a lid 606, which is removable to allow rib 200 to be placed into bonding tool 602 for the bonding process. In this embodiment, lid 606 includes a plurality of thumb screws 608 which are used to secure lid 606 to base member 604. Generally, lid 606 is used to hold one or more bladders in place (not shown in this view), which expands to press the sacrificial pads to the bonding locations 202-203. In this embodiment, rib 200 is loaded into bonding tool 602 with surface 204 of rib 200 towards lid 606 and surface 205 (not shown in this view) of rib 200 towards base member 604.

FIG. 7 depicts some of the major components in an exploded view of bonding tool 602 in an illustrative embodiment. Generally, compression forms 702 include sacrificial pads 402 (not shown in this view), and align sacrificial pads 402 to bonding locations 202-203 on rib 200. At least one bladder 704 is proximate to and/or surrounds compression forms 702, which expand under pressure to press sacrificial pads 402 to bonding locations 202-203 of rib 200 during the bonding process. Bladder 704 comprises one or more expandable bags that elastically deform, such as when inflated with a fluid or a gas.

In this embodiment, compression forms 702 include removable sacrificial pads 402 along their inner surfaces that contact bonding locations 202-203 on rib 200 during the bonding process (sacrificial pads 402 are not shown in this view). Thus, sacrificial pads 402 are loaded at locations on the inner surfaces of compression forms 702 that correspond to bonding locations 202-203 on rib 200. For example, sacrificial pads 402 may be temporarily secured to the inner surfaces of compression forms 702 using a temporary adhesive, using clips, or cutouts in the inner surfaces of compression forms 702, etc. A vacuum plate 706 of bonding tool 602 applies a vacuum to surface 205 of rib 200, securing rib 200 to base member 604 during the bonding process.

Figure 8:
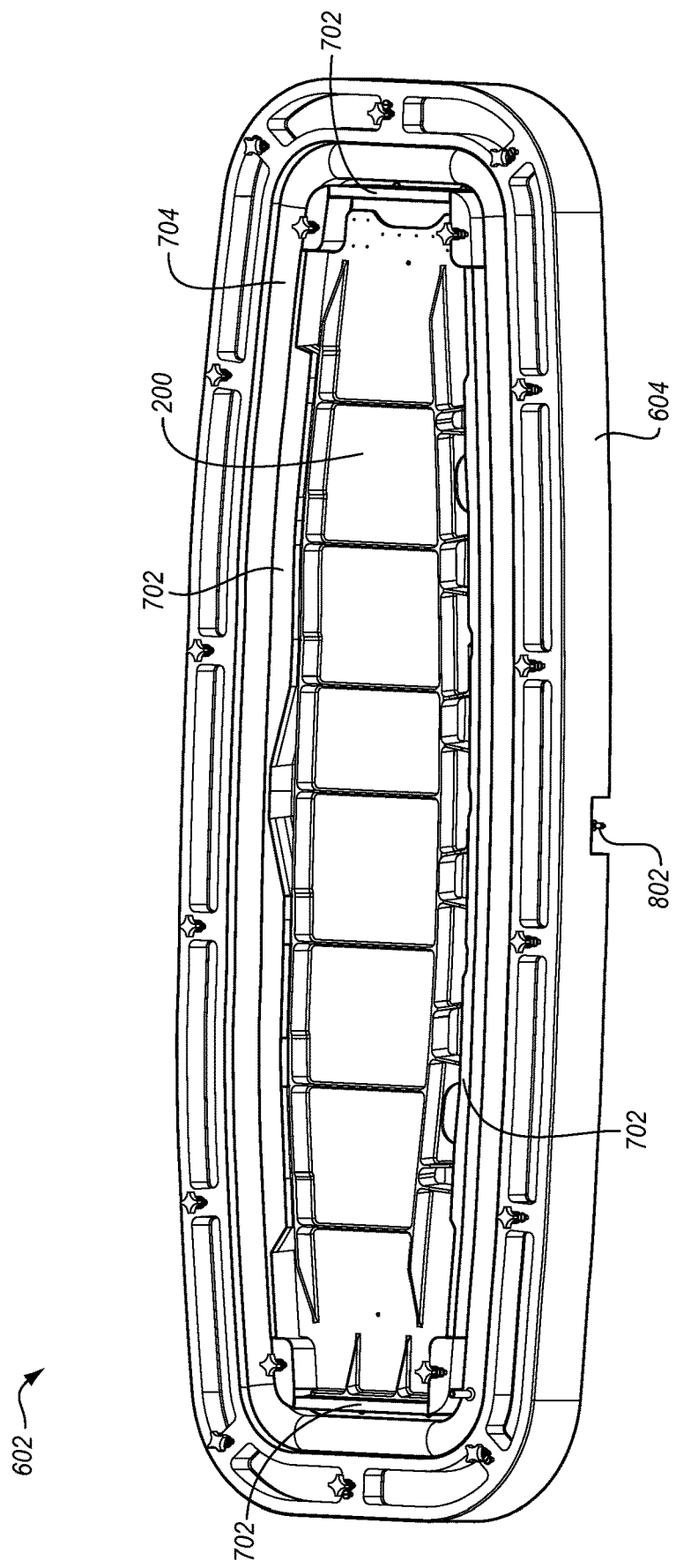
FIG. 8 is an isometric view of the bonding tool of FIG. 6 without a lid in an illustrative embodiment.

FIG. 8 is an isometric view of bonding tool 602 without lid 606 in an illustrative embodiment. In this embodiment, four of compression forms 702 are used, one for each side of rib 200 that collectively, form perimeter 206 of rib 200. Other embodiments may use a different number of compression forms 702 depending on the shape of perimeter 206 of rib 200. In this embodiment, base member 604 includes a pressure port 802 that is used to pressurize and depressurize bladder 704 with a gas or a liquid. For example, pressure port 802 may be used to supply pressurized air into bladder 704, which expands bladder 704 and provides the force to press sacrificial pads 402 to bonding locations 202-203. In another example, pressurized water, oil, or another liquid may be supplied by pressure port 802 to bladder 704 to provide the force. When a liquid is used to pressurize bladder 704, the liquid may be heated to enable or speed up the curing process for the adhesive(s) applied between bonding locations 202-203 on rib 200 and sacrificial pads 402.

Figure 9:
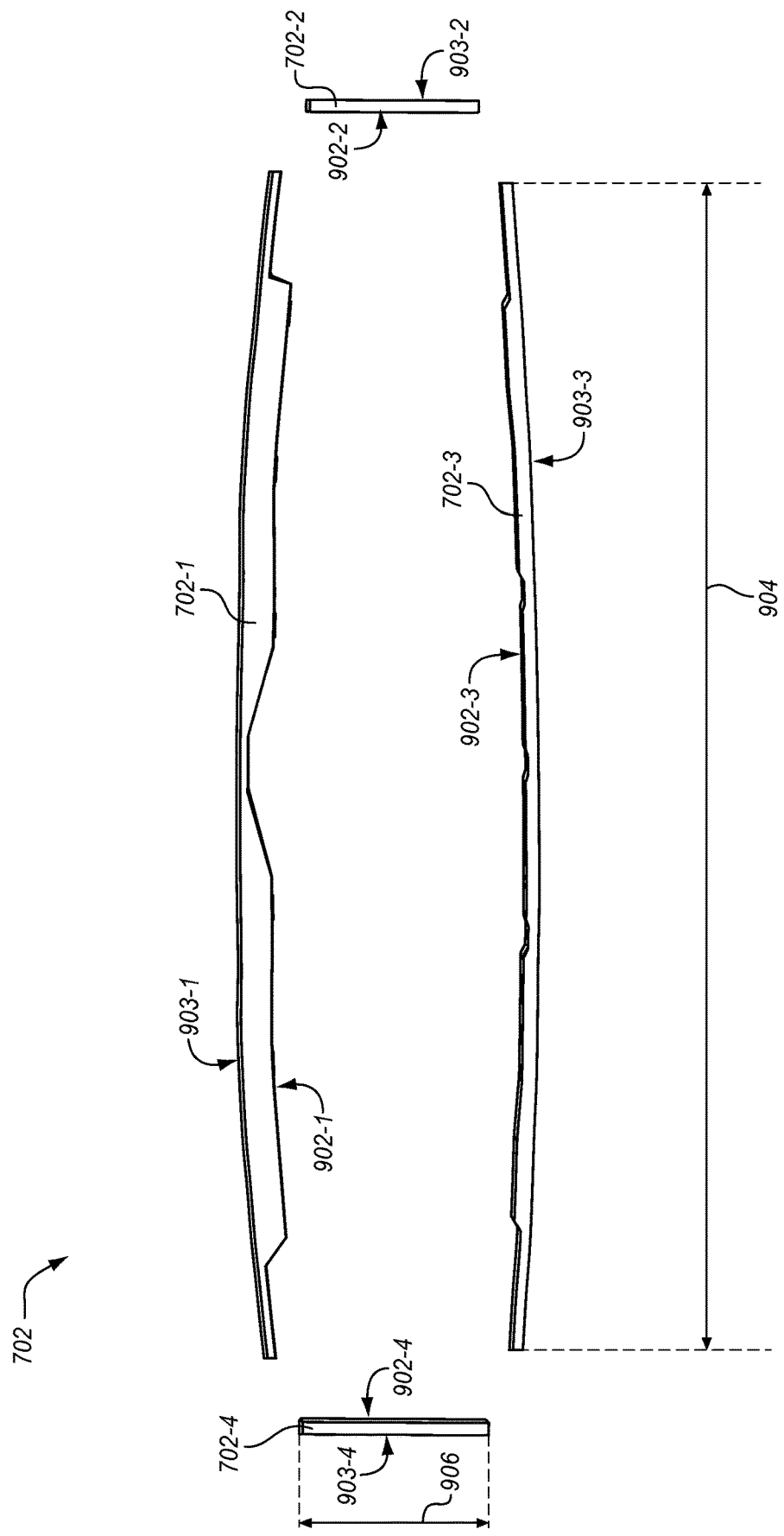
FIG. 9 is an isometric view of compression forms of the bonding tool of FIG. 6 in an illustrative embodiment.
Figure 10:
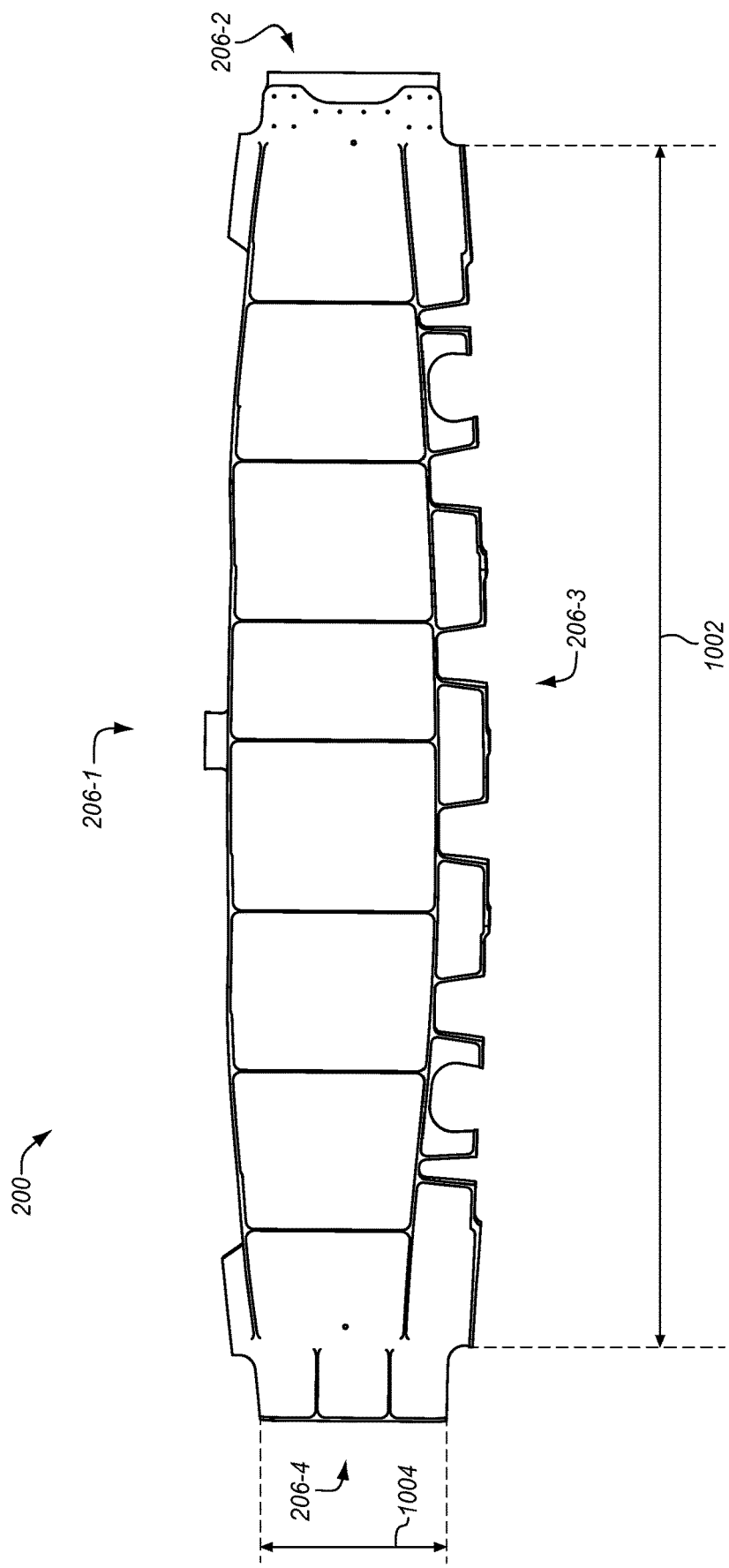
FIG. 10 is an isometric view of the rib of FIGS. 2-5 in another illustrative embodiment.

FIG. 9 is a view of compression forms 702 as oriented in FIG. 6 without rib 200, and FIG. 10 illustrates rib 200 in the same orientation as FIG. 6 without compression forms 702 in illustrative embodiments. Referring to FIG. 9, compression forms 702 each have an inner surface 902 that collectively contacts bonding locations 202-203 on rib 200 and an outer surface 903 that contact bladder 704. Outer surfaces 903 of compression forms 702 are generally smooth, while inner surfaces 902 of compression forms 702 are patterned to correspond to a segment of perimeter 206 on rib 200. In this embodiment, a first compression form 702-1 has an inner surface 902-1 that contacts bonding locations 202 on rib 200 along a perimeter segment 206-1 (see FIG. 10), and an outer surface 903-1 that contacts bladder 704. A second compression form 702-2 has an inner surface 902-2 (see FIG. 10), that contacts bonding locations 203 on rib 200 along a perimeter segment 206-2 (see FIG. 10), and an outer surface 903-2 that contacts bladder. A third compression form 702-3 (see FIG. 10), has an inner surface 902-3 that contacts bonding locations 202 on rib 200 along a perimeter segment 206-3, and an outer surface 903-3 that contacts bladder 704. A fourth compression form 702-4 has an inner surface 902-4 that contacts bonding locations 203 on rib 200 along a perimeter segment 206-4 (see FIG. 10), and an outer surface 903-4 that contacts bladder 704.

In this embodiment, first compression form 702-1 and third compression form 702-3 share a common length 904, which generally corresponds to length 1002 of perimeter segment 206-1 and perimeter segment 206-3. Second compression form 702-2 and fourth compression form 702-4 also share a common length 906, which generally corresponds to length 1004 of perimeter segment 206-2 and perimeter segment 206-4.

Figure 11:
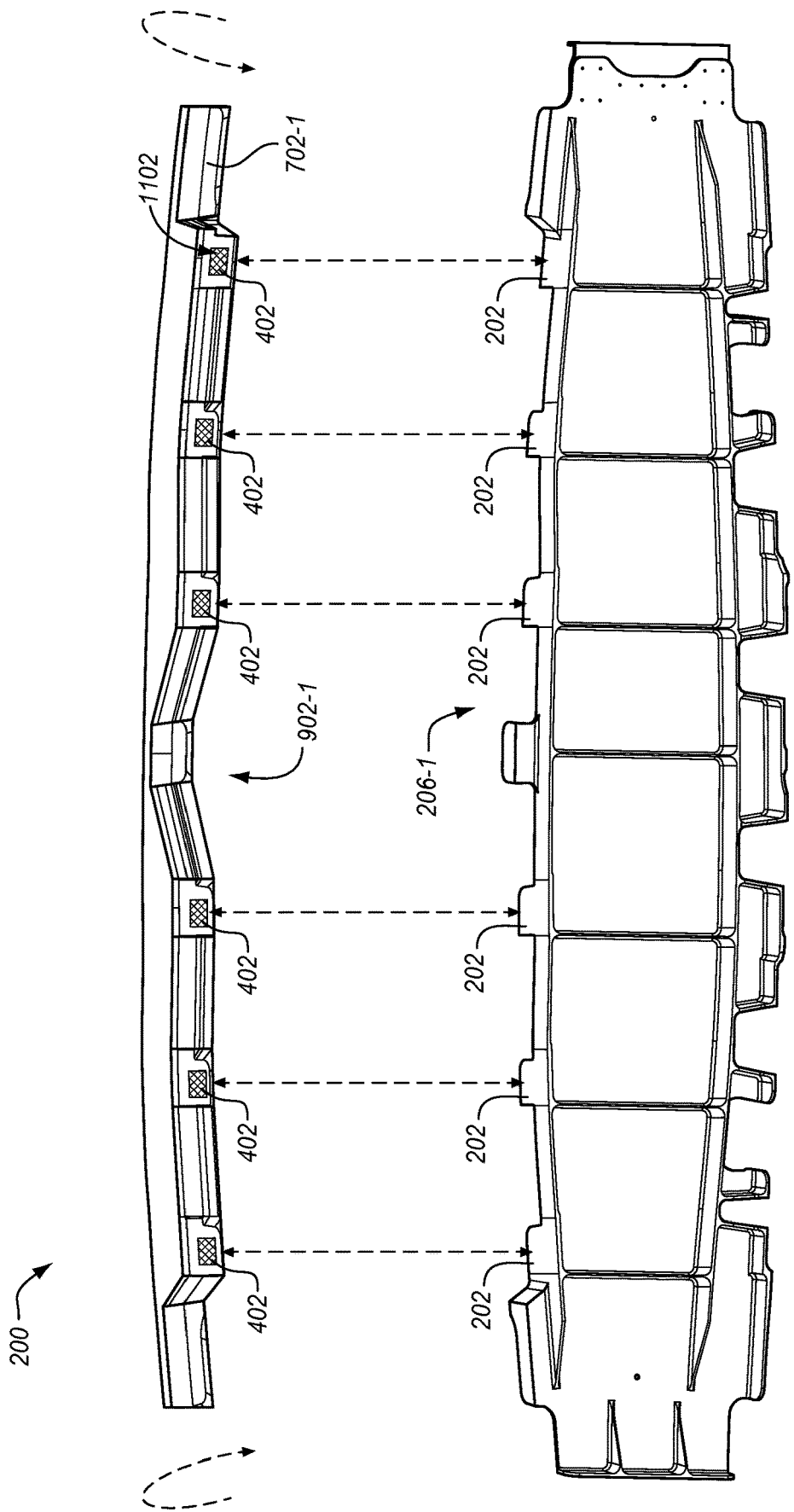
FIGS. 11-12 are isometric views of the compression forms of FIG. 9 and the rib of FIGS. 2-5 in an illustrative embodiment.
Figure 12:
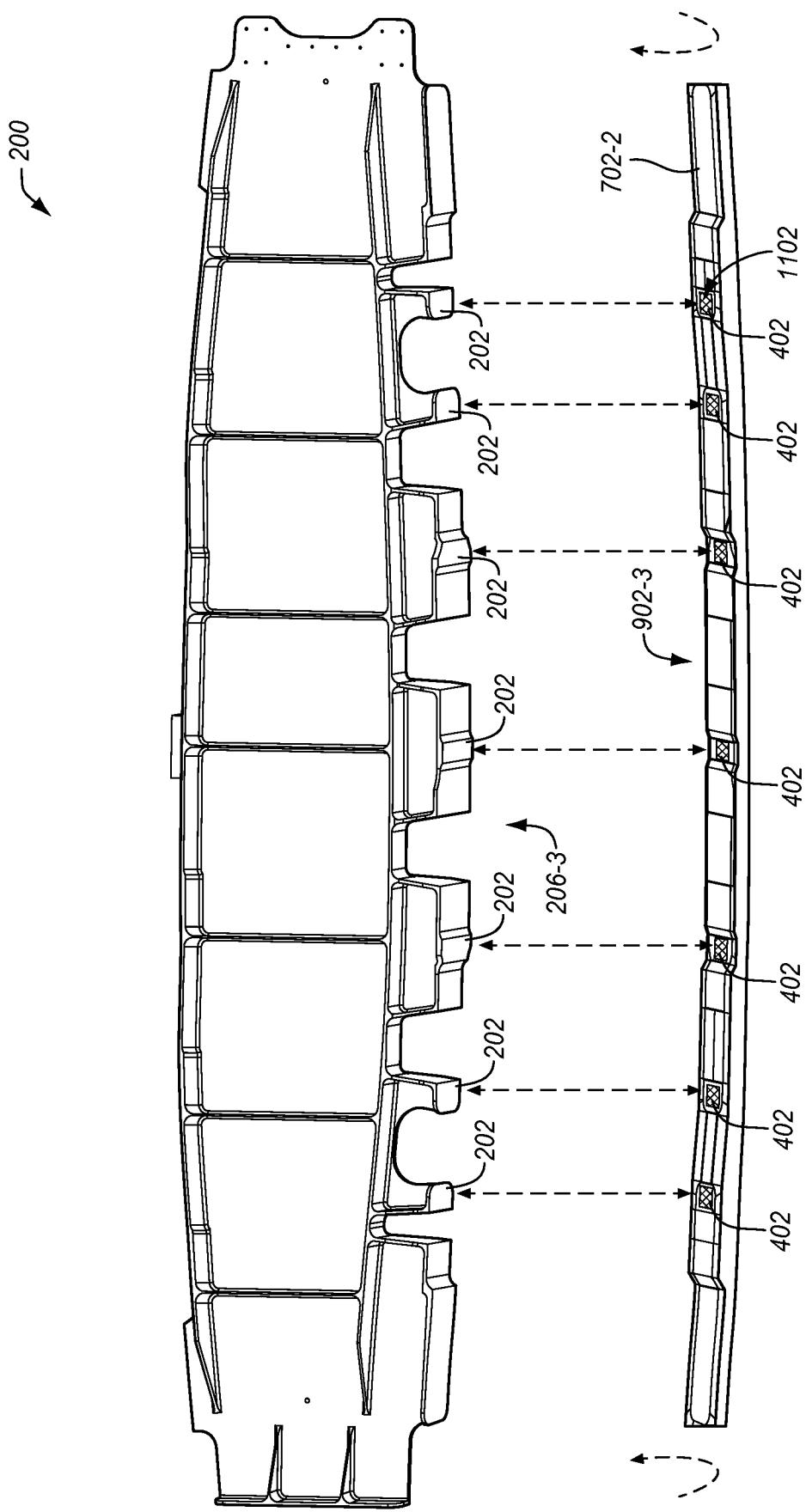

FIGS. 11-12 are isometric views of the compression forms of FIG. 9 and the rib of FIGS. 2-5 in an illustrative embodiment. FIG. 11 depicts first compression form 702-1 with sacrificial pads 402 applied to inner surface 902-1. FIG. 11 also depicts perimeter segment 206-1 of rib 200, and how bonding locations 202 on perimeter segment 206-1 correspond one-to-one spatially with a placement of sacrificial pads 402 on inner surface 902-1 of first compression form 702-1 (e.g., inner surface 902-1 is patterned to correspond to perimeter segment 206-1 of rib 200). FIG. 12 depicts third compression form 702-3 with sacrificial pads 402 applied to inner surface 902-3. FIG. 12 also depicts perimeter segment 206-3 of rib 200, and how bonding locations 202 on perimeter segment 206-3 correspond 1-1 spatially with a placement of sacrificial pads 402 on inner surface 902-3 of third compression form 702-3 (e.g., inner surface 902-3 is patterned to correspond to perimeter segment 206-3 of rib 200). The same relationship exists for second compression form 702-2 and perimeter segment 206-2 and fourth compression form 702-4 and perimeter segment 206-4 at bonding locations 203 on rib 200, which are simple planar mating surfaces in this embodiment.

Figure 13:
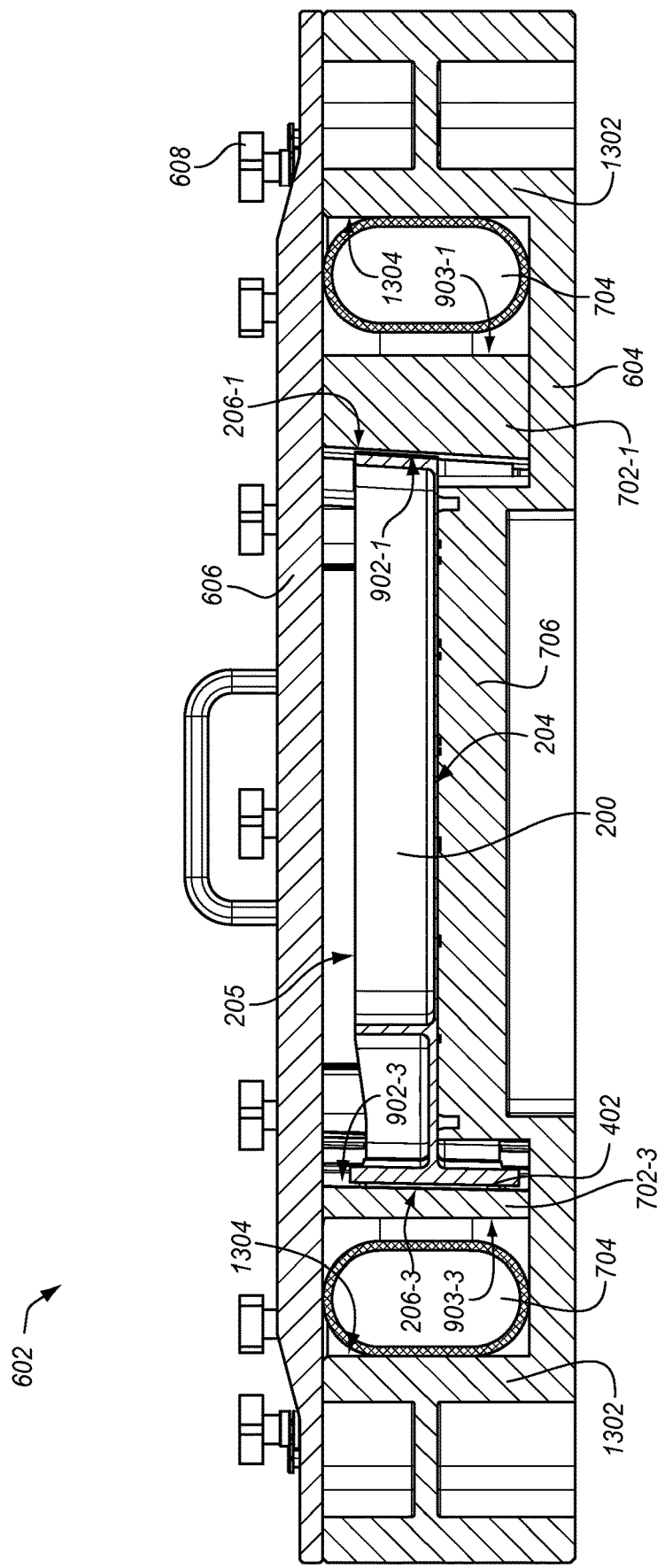
FIG. 13 is a cross-sectional view of the bonding tool of FIG. 6 in an illustrative embodiment.

FIG. 13 is a cross-sectional view of bonding tool 602 along cut lines A-A depicted in FIG. 6 in an illustrative embodiment. As evident in FIG. 13, bladder 704 is disposed between a wall 1302 of base member 604 and first compression form 702-1 and third compression form 702-3. As bladder 704 is pressurized, bladder 704 expands between a surface 1304 of wall 1302 of base member 604 and outer surface 903-3 of third compression form 702-3 (left side of FIG. 13), which generates a force between inner surface 902-3 of third compression form 702-3 and bonding locations 202 on perimeter segment 206-3 of rib 200. Bladder 704 also expands between surface 1304 of wall 1302 of base member 604 and outer surface 903-1 of first compression form 702-1 (right side of FIG. 13), which generates a force between inner surface 902-1 of first compression form 702-1 and bonding locations 202 on perimeter segment 206-1 of rib 200. A similar clamping force is applied to second compression form 702-2 and bonding locations 203 on perimeter segment 206-2 of rib 200, and to fourth compression form 702-4 and bonding locations 203 on perimeter segment 206-4 of rib 200.

Figure 14:
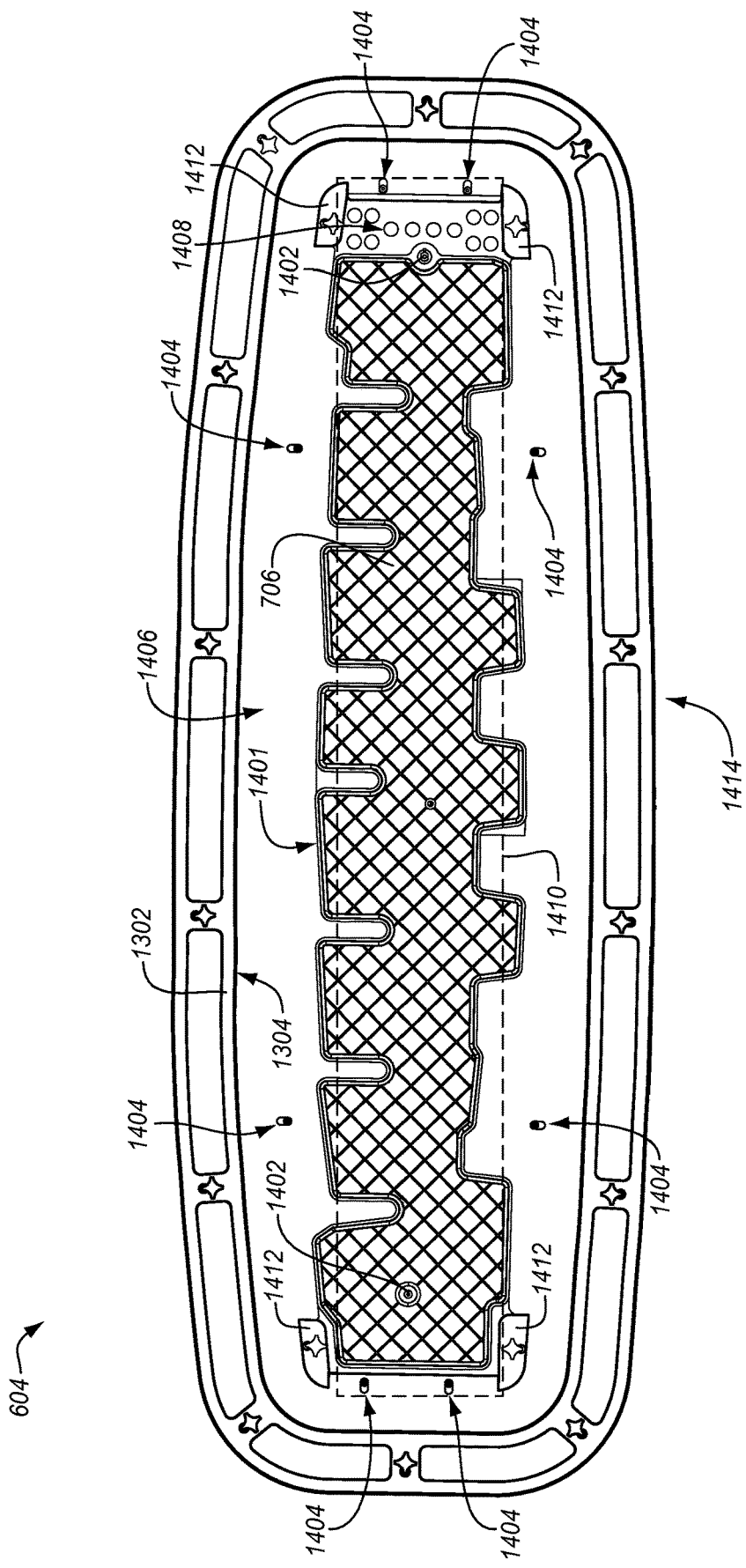
FIG. 14 is an isometric view of a base member of the bonding tool of FIG. 6 in an illustrative embodiment.

FIG. 14 is an isometric view of base member 604 of bonding tool 602 in an illustrative embodiment. In this view, rib 200, compression forms 702, and bladder 704 have been removed to expose vacuum plate 706. In this embodiment, vacuum plate 706 has an outer border 1401 that is similar to perimeter 206 of rib 200 on surface 205 (see FIG. 15, which is an isometric view of surface 205 of rib 200 in an illustrative embodiment).

Figure 15:
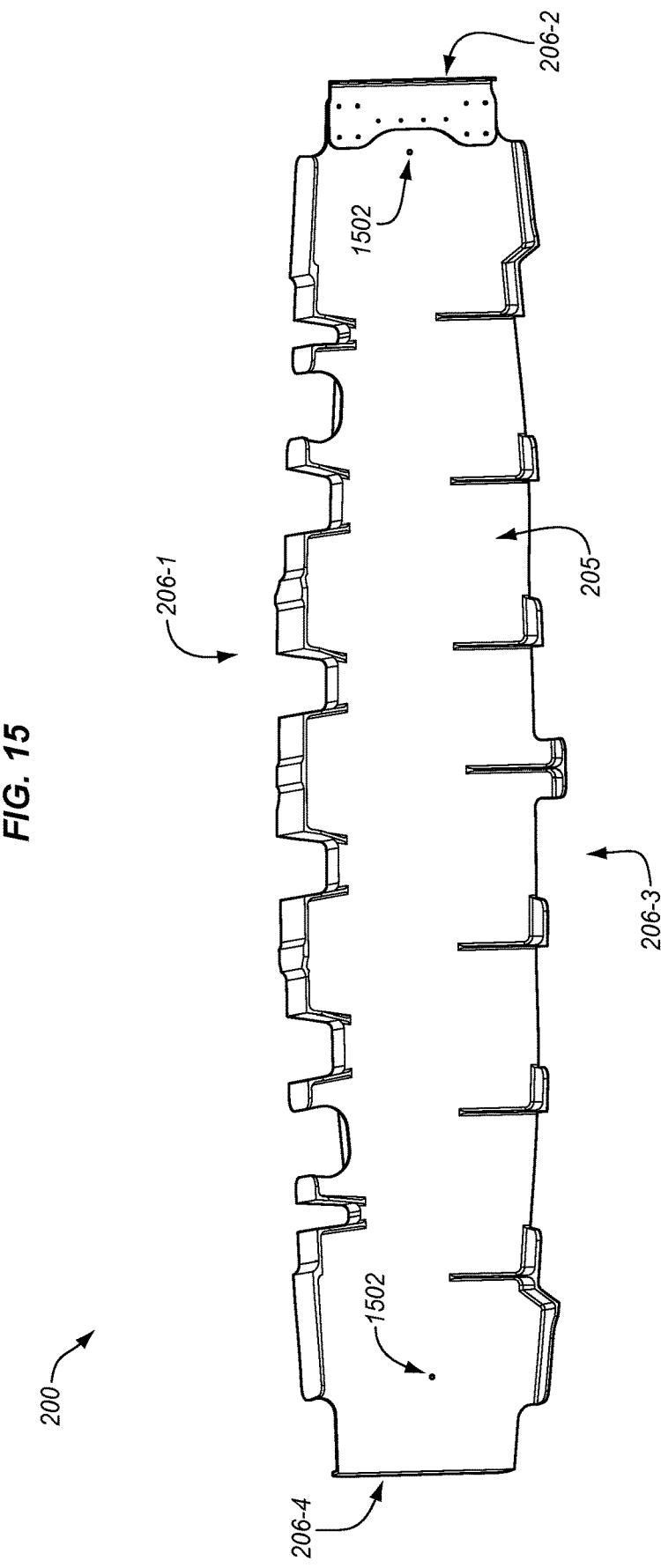
FIG. 15 is an isometric view of the rib of FIGS. 2-5 in another illustrative embodiment.
Figure 16:
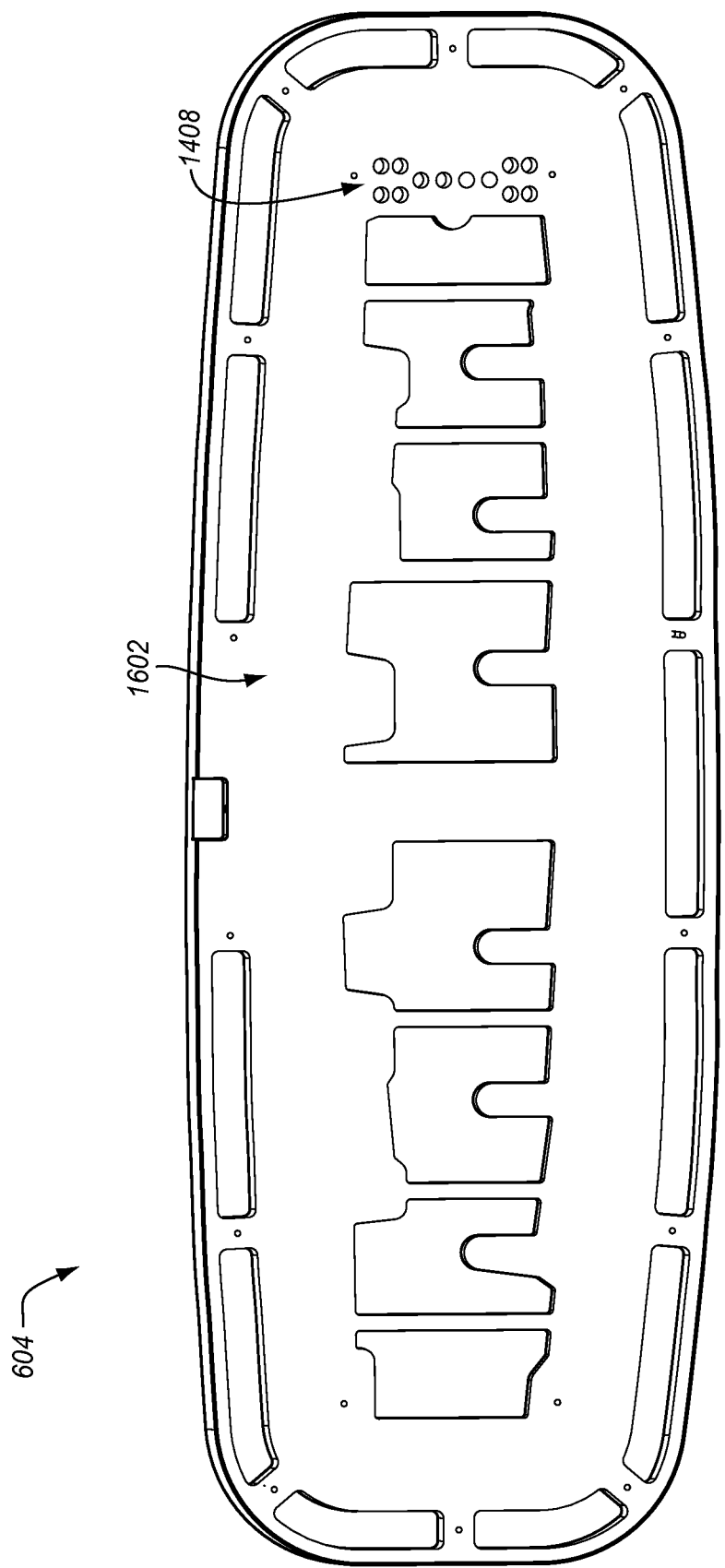
FIG. 16 is an isometric view of the base member of the bonding tool of FIG. 6 in another illustrative embodiment.

Vacuum plate 706 contacts surface 205 of rib 200, and includes index members 1402 that correspond to holes 1502 in rib 200 (see FIG. 15). Index members 1402 may be used with pins (not shown) to align rib 200 to base member 604 using holes 1502 in rib 200. Also visible with compression forms 702 removed are a plurality of pins 1404 that extend from a surface 1406 of base member 604 and align and secure compression forms 702 to base member 604. Pins 1404 are not fixed in place but rather, are free to move either towards or away from vacuum plate 706 in order to selectively apply the clamping force to rib 200. FIG. 14 further illustrates that base member 604 includes a rib receptacle 1410, which is centrally located on base member 604 and dimensioned to accept rib 200 along surface 205 of rib 200. Generally, rib receptacle 1410 is bounded on each corner by bladder guides 1412, which position bladder 704 between surface 1304 of wall 1302 of base member 604 and rib receptacle 1410. Base member 604 includes a perimeter 1414 that surrounds wall 1302 of base member 604, previously described with respect to FIG. 13. In this embodiment, base member 604 includes a plurality of vacuum ports 1408 that extend through base member 604 from surface 1406 to a surface 1602 of base member 604, as illustrated in FIG. 16.

Figure 17:
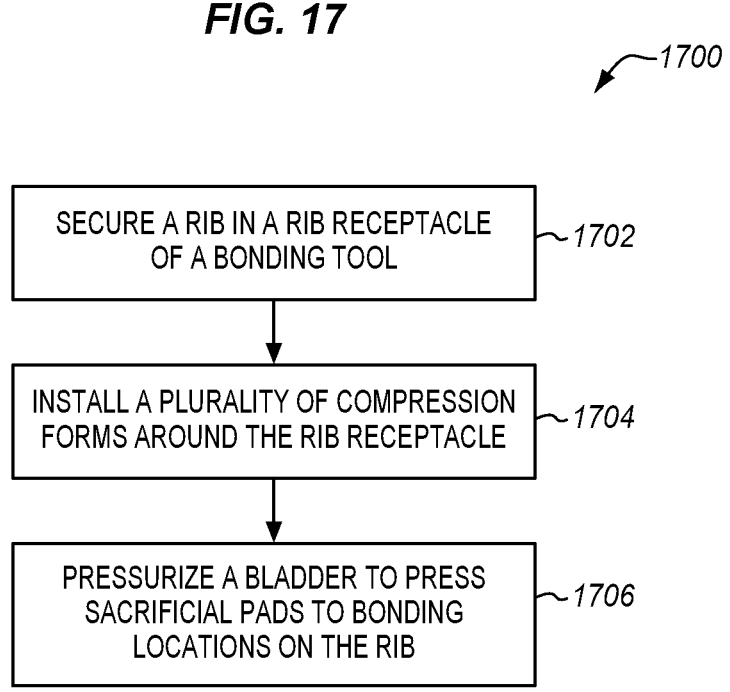
FIG. 17 is a flow chart of a method of operating a bonding tool in an illustrative embodiment.

FIG. 17 is a flow chart of a method 1700 of operating a bonding tool in an illustrative embodiment. FIGS. 18-22 depict additional details of method 1700 in illustrative embodiments.

Method 1700 will be described with respect to rib 200 of FIGS. 2-5 and bonding tool 602 of FIGS. 6-16, although method 1700 may be performed by other bonding tools, not shown. Method 1700 may include other steps, not shown. Further, the steps of method 1700 may be performed in an alternate order.

Step 1702 (see FIG. 17) comprises securing rib 200 in rib receptacle 1410 of base member 604. For example, rib 200 may be place within rib receptacle 1410 with surface 205 towards surface 1406 of base member 604, with rib 200 loosely held in position by bladder guides 1412. Pins may be applied through holes 1502 in rib 200, which may extend into index members 1402 in base member 604 (see FIGS. 14-15).

Step 1704 comprises installing compression forms 702 around rib receptacle 1410. When installed, inner surfaces 902 of compression forms 702 position sacrificial pads 402 facing bonding locations 202-203 on perimeter 206 of rib 200. For example, compression forms 702 may be engaged with pins 1404 on base member 604, which locate compression forms 702 at a pre-defined position relative to rib 200.

Step 1706 comprises pressurizing bladder 704 to press sacrificial pads 402 to bonding locations 202-203 on rib 200. As bladder 704 is pressurized, bladder 704 expands between wall 1302 of base member 604 and compression forms 702, pressing sacrificial pads 402 that face bonding locations 202-203 up against rib 200. Pressure on bladder 704 is maintained until sacrificial pads 402 bond to bonding locations 202-203. Once the bonding is complete, the pressure on bladder 704 is removed, which releases compression forms 702 from rib 200. Rib 200 may then be removed and is ready for installation in the wing. This process may be completed for additional ribs for the wing, with new sacrificial pads 402 applied to compression forms 702 and another rib 200 secured to rib receptacle 1410.

Figure 18:
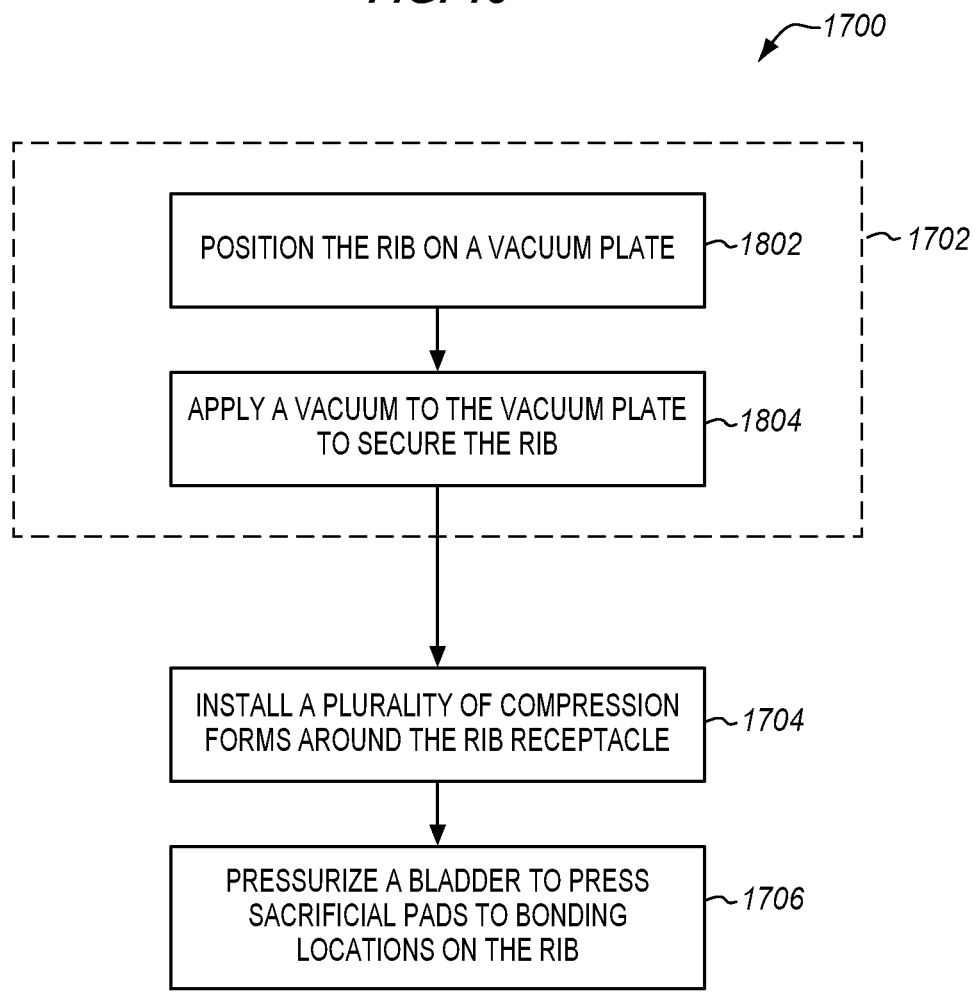
FIGS. 18-22 are flow charts depicting additional details of the method of FIG. 17 in illustrative embodiments.

In some embodiments, rib receptacle 1410 includes vacuum plate 706, and rib 200 is positioned on vacuum plate 706 (see FIG. 18, step 1802). Once rib 200 is positioned, a vacuum may be applied to vacuum plate 706 (see FIG. 18, step 1804) in order to secure rib 200 to vacuum plate 706. For instance, rib 200 may be placed on vacuum plate 706, with surface 205 of rib 200 facing vacuum plate 706. When a vacuum is applied to vacuum plate 706, the force of the vacuum holds surface 205 of rib 200 tightly against vacuum plate 706.

Figure 19:
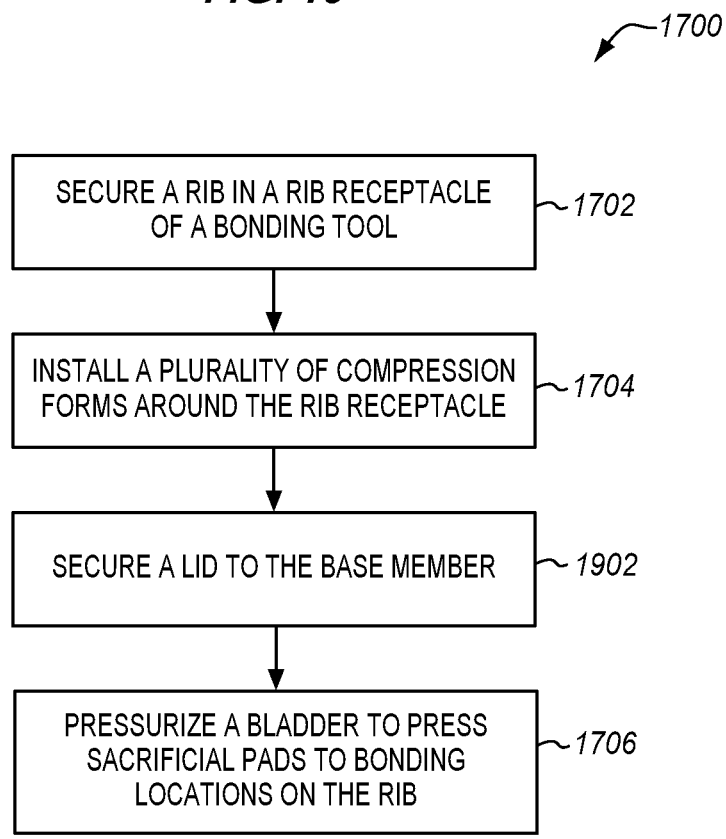

In some embodiments, lid 606 is secured to base member 604 to capture bladder 704 between compression forms 702, wall 1302 of base member 604, and lid 606 (see FIG. 19, step 1902). Thumb screws 608 may be used to secure lid 606 to base member 604.

Figure 20:
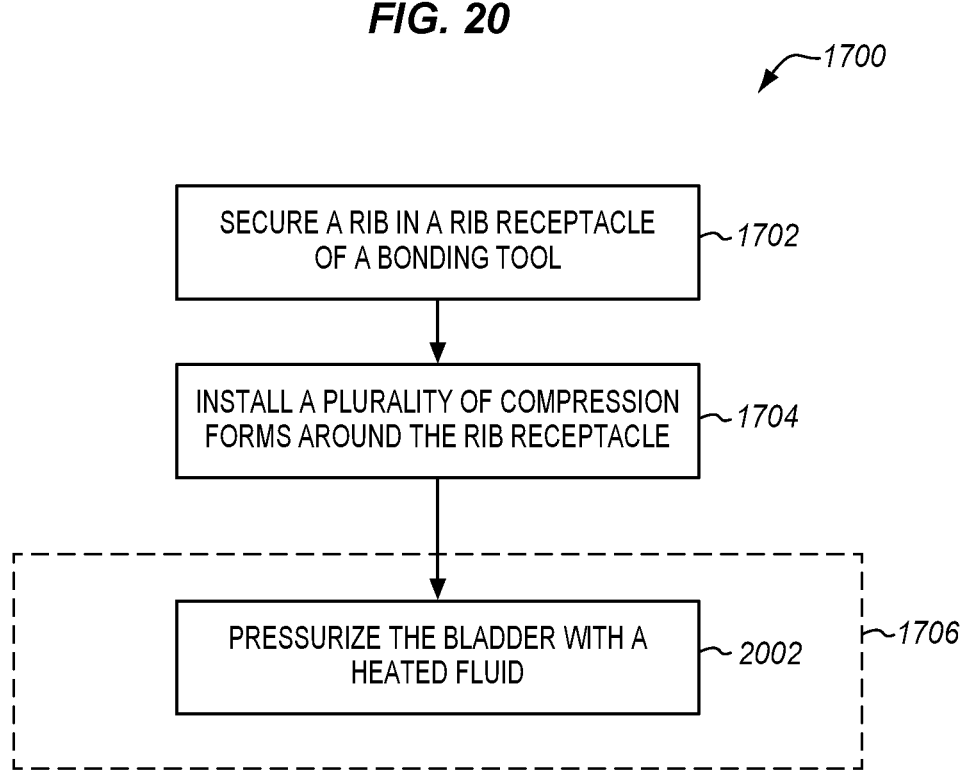

As discussed previously, bladder 704 may be pressurized with a heated fluid in some embodiments (see FIG. 20, step 2002). The heated fluid may be used, for example, to thermally cure an epoxy used to bond sacrificial pads 402 to bonding locations 202-203 on rib 200.

Figure 21:
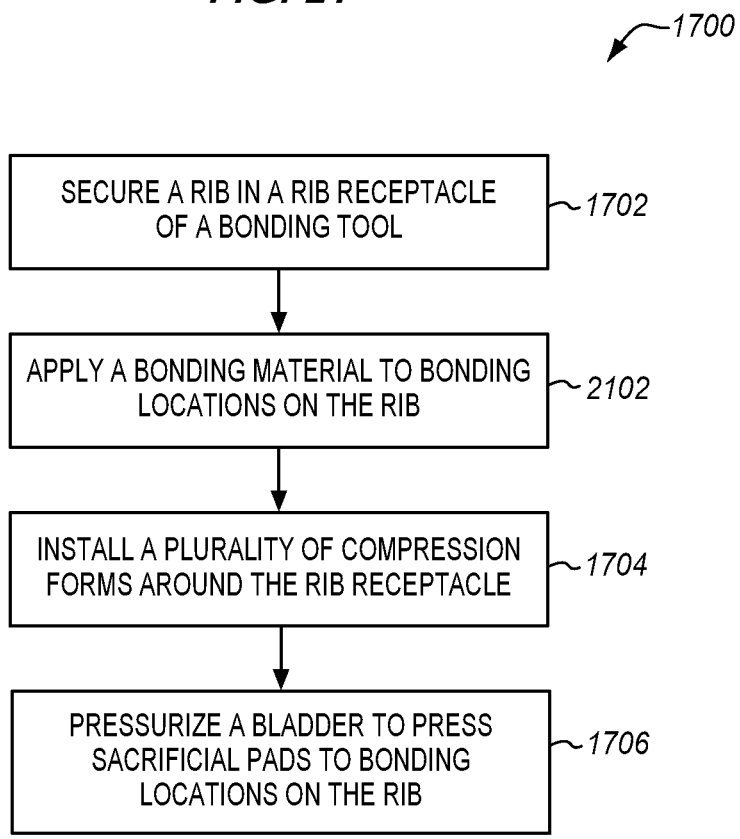
Figure 22:
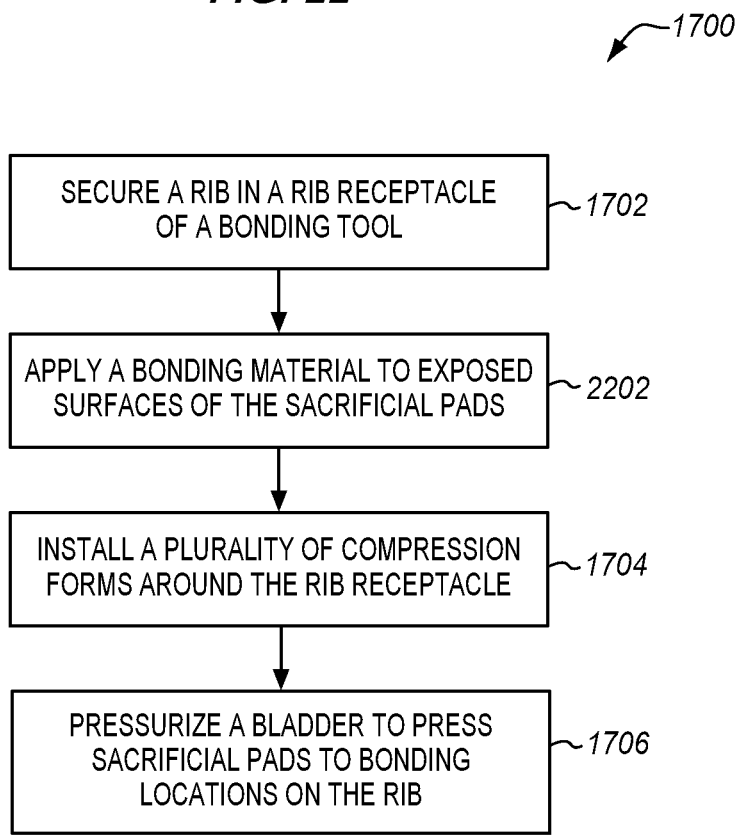

In some embodiments, a bonding material may be applied to bonding locations 202-203 on perimeter 206 of rib 200 prior to positioning compression forms 702 (see FIG. 21, step 2102). For example, an epoxy may be applied to bonding locations 202-203 on rib 200. However, in other embodiments, a bonding material may be applied to exposed surfaces 1102 (see FIGS. 11-12) of sacrificial pads 402 prior to installing compression forms 702 (see FIG. 22, step 2202). For example, an epoxy may be applied to exposed surfaces 1102 of sacrificial pads 402 that will contact rib 200 at bonding locations 202-203.

Figure 23:
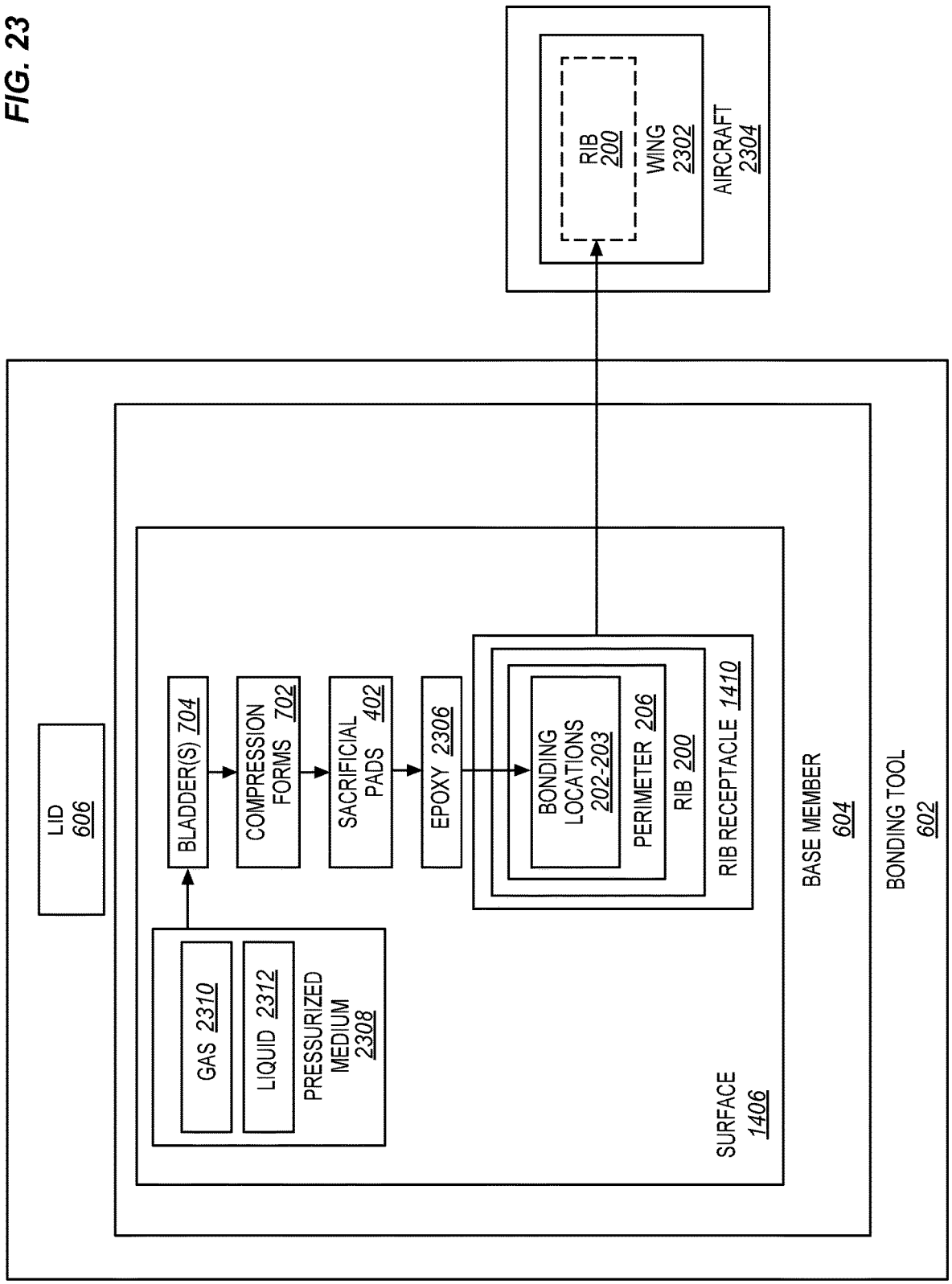
FIG. 23 is a block diagram of a bonding tool in an illustrative embodiment.

FIG. 23 is a block diagram of bonding tool 602 in another illustrative embodiment. In this embodiment, bonding tool 602 is used to bond sacrificial pads 402 to bonding locations 202-203 on rib 200 prior to assembling rib 200 into a wing 2302 of an aircraft 2304. In this embodiment, bonding tool 602 includes base member 604 and lid 606, either of which can have any configuration as desired in order to perform the functions described herein for these elements. Generally, sacrificial pads are squeezed between compression forms 702 and perimeter 206 of rib 200 at bonding locations 202-203 using pressure applied to compression forms 702 by at least one bladder 704 to allow time for an epoxy 2306 located between sacrificial pads 402 and bonding locations 202-203. Bladder 704 and/or compression forms 702 may have any configuration as desired in order to perform the functions described herein for these elements. To generate a desired force between compression forms 702 and bonding locations 202-203 on rib 200, a pressurized medium 2308 may be applied to bladder 704. Pressurized medium 2308 may include a gas 2310 and/or a liquid 2312. In some embodiments, liquid 2312 may be heated in order to cure epoxy 2306. Once epoxy 2306 has cured, pressure on bladder 704 is removed, and rib 200 may be removed from bonding tool 602 and installed in wing 2302.

Figure 24:
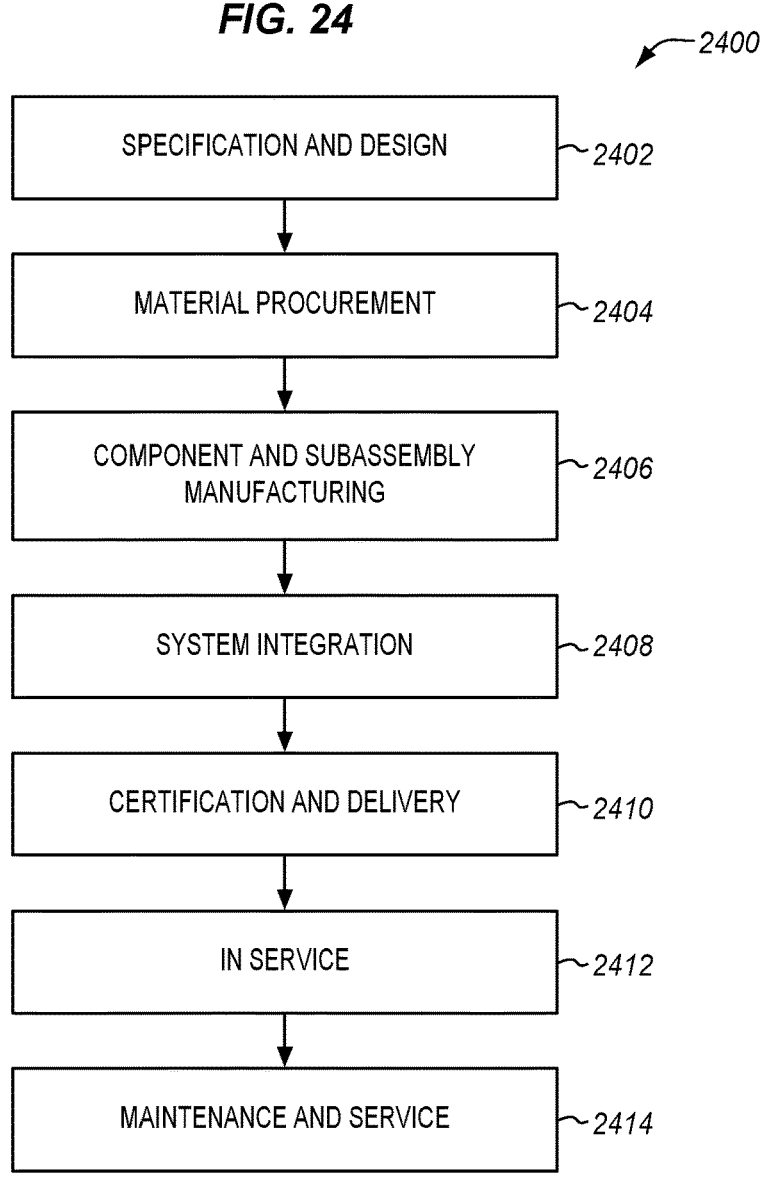
FIG. 24 is a flow chart illustrating an aircraft manufacturing and service method in an illustrative embodiment.
Figure 25:
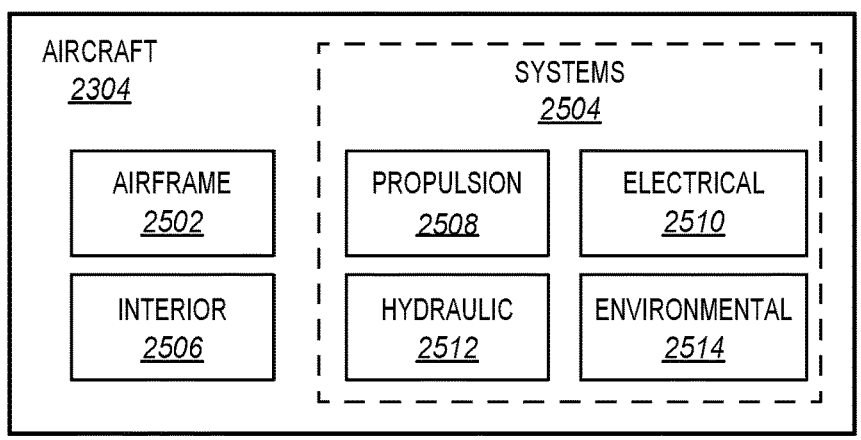
FIG. 25 is a schematic diagram of an aircraft in an illustrative embodiment.

The embodiments of the disclosure may be described in the context of an aircraft manufacturing and service method 2400 as shown in FIG. 24 and aircraft 2304 as shown in FIG. 25. During pre-production, exemplary method 2400 may include a specification and design 2402 of aircraft 2304, and material procurement 2404. During production, component and subassembly manufacturing 2406 and system integration 2408 of aircraft 2304 takes place. Thereafter, aircraft 2304 may go through certification and delivery 2410 in order to be placed in service 2412. While in service by a customer, aircraft 2304 is scheduled for routine maintenance and service 2414 (which may also include modification, reconfiguration, refurbishment, and so on).

Each of the processes of method 2400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 25, aircraft 2304 produced by exemplary method 2400 may include an airframe 2502 with a plurality of systems 2504 and an interior 2506. Examples of high-level systems 2504 include one or more of propulsion systems 2508, an electrical system 2510, a hydraulic system 2512, and an environmental system 2514. Any number of other systems may be included. Although an aerospace example is shown, the principles described in this specification may be applied to other industries, such as the automotive industry.

Apparatus and methods embodied herein may be employed during any one or more of the stages of the production and service method 2400. For example, components or subassemblies corresponding to process 2406 may be fabricated or manufactured in a manner similar to components or subassemblies produced while aircraft 2304 is in service. Also, one or more apparatus embodiments, method embodiments, or a combination thereof may be utilized during the component subassembly and manufacturing 2406 and system integration 2408, for example, by substantially expediting assembly of or reducing the cost of aircraft 2304. Similarly, one or more of apparatus embodiments, method embodiments, or a combination thereof may be utilized while aircraft 2304 is in service, for example and without limitation, to maintenance and service 2414.

Although specific embodiments were described herein, the scope is not limited to those specific embodiments. Rather, the scope is defined by the following claims and any equivalents thereof.

What is claimed is:

1. A bonding tool comprising:
a base member having a rib receptacle dimensioned to receive a rib of a wing;
a vacuum plate disposed within the rib receptacle that is configured to apply a vacuum to a surface of a rib received within the rib receptacle, to secure the rib to the base member;
a compression form disposed along at least a portion of the rib receptacle, wherein the compression form includes at least one sacrificial pad configured to bond with at least one corresponding bonding location on a perimeter of the rib; and
a bladder disposed between a wall of the base member and the compression form, wherein the bladder is configured to expand and thereby press the at least one sacrificial pad against the at least one corresponding bonding location.

2. The bonding tool of claim 1, further comprising:
a lid removably coupled to the base member that is configured to capture the bladder between the compression form, the wall of the base member, and the lid.

3. The bonding tool of claim 1, further comprising:
at least one bladder guide disposed around the rib receptacle that is configured to position the bladder between the wall of the base member and the compression form.

4. The bonding tool of claim 1, wherein:
the bladder is configured to expand with an application of a heated fluid that thermally promotes bonding of the at least one sacrificial pad to the at least one corresponding bonding location.

5. The bonding tool of claim 1, wherein:
the at least one sacrificial pad is removably secured to the compression form.

6. The bonding tool of claim 1, wherein:
the base member includes at least one pin that extends from a surface of the base member and is configured to align the compression form to the rib receptacle.

7. The bonding tool of claim 6, wherein:
the compression form is configured to engage with the at least one pin to transition the compression form towards and away from the rib receptacle.

8. A method of operating a bonding tool, the method comprising:
installing at least one sacrificial pad on a compression form;
applying an adhesive to one or more of the at least one sacrificial pad and at least one bonding location on a perimeter of a rib of a wing;
securing the rib in a rib receptacle of a base member of the bonding tool;
installing the compression form along at least a portion of the rib receptacle, wherein the at least one sacrificial pad corresponds with the at least one bonding location on the perimeter of the rib; and
pressurizing a bladder disposed between a wall of the base member and the compression form that expands and thereby presses the at least one sacrificial pad against the at least one bonding location while the at least one sacrificial pad bonds to the at least one bonding location using the adhesive,
wherein securing the rib comprises:
positioning the rib on a vacuum plate; and
applying a vacuum to a surface of the rib using the vacuum plate to secure the rib to the base member.

9. The method of claim 8, further comprising:
securing a lid to the base member to capture the bladder between the compression form, the wall, and the lid.

10. The method of claim 8, wherein pressurizing the bladder comprises:
pressurizing the bladder with a heated fluid that thermally promotes bonding of the at least one sacrificial pad to the at least one bonding location.

11. The method of claim 8, wherein:
the vacuum plate includes index members that correspond to holes in the rib.

12. The method of claim 8, wherein applying the adhesive comprises:
applying the adhesive to the at least one sacrificial pad.

13. The method of claim 8, wherein installing the compression form comprises:
engaging the compression form with at least one pin that extends from a surface of the base member and aligns the compression form to the rib receptacle.

14. The method of claim 13, wherein:
the at least one pin moves within a slot in the surface of the base member to allow the compression form to transition towards and away from the rib receptacle.

15. A method of operating a bonding tool, the method comprising:
applying an adhesive to at least one bonding location on a perimeter of a rib of a wing;
applying at least one sacrificial pad to the at least one bonding location;
securing the rib in a rib receptacle of a base member of the bonding tool;
installing a compression form along at least a portion of the rib receptacle that includes the at least one bonding location; and
pressurizing a bladder disposed between a wall of the base member and the compression form that expands and thereby presses the at least one sacrificial pad against the at least one bonding location while the at least one sacrificial pad bonds to the at least one bonding location using the adhesive,
wherein securing the rib comprises:
positioning the rib on a vacuum plate; and
applying a vacuum to a surface of the rib using the vacuum plate to secure the rib to the base member.

16. The method of claim 15, further comprising:
securing a lid to the base member to capture the bladder between the compression form, the wall, and the lid.

17. The method of claim 15, wherein pressurizing the bladder comprises:
pressurizing the bladder with a heated fluid that thermally promotes bonding of the at least one sacrificial pad to the at least one bonding location.

18. The method of claim 15, wherein:
the vacuum plate includes index members that correspond to holes in the rib.

19. The method of claim 15, wherein installing the compression form comprises:
engaging the compression form with at least one pin that extends from a surface of the base member and aligns the compression form to the rib receptacle.

20. The method of claim 19, wherein:
the at least one pin moves within a slot in the surface of the base member to allow the compression form to transition towards and away from the rib receptacle.

\* \* \* \* \*